(12) United States Patent
Cihla et al.

(10) Patent No.: US 7,472,231 B1
(45) Date of Patent: Dec. 30, 2008

(54) STORAGE AREA NETWORK DATA CACHE

(75) Inventors: James Lawrence Cihla, San Jose, CA (US); Ryan Herbst, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 146 days.

(21) Appl. No.: 10/237,560

(22) Filed: Sep. 6, 2002

Related U.S. Application Data

(60) Provisional application No. 60/317,817, filed on Sep. 7, 2001.

(51) Int. Cl.
*G06F 12/00* (2006.01)

(52) U.S. Cl. .................. 711/144; 711/147; 711/203; 709/213

(58) Field of Classification Search ................ 711/108, 711/125, 126, 154, 205, 206, 136, 137; 709/225; 345/543, 547
See application file for complete search history.

(56) References Cited

U.S. PATENT DOCUMENTS

| | | | | |
|---|---|---|---|---|
| 5,455,834 | A * | 10/1995 | Chang et al. | 714/768 |
| 5,668,968 | A * | 9/1997 | Wu | 711/3 |
| 5,787,494 | A * | 7/1998 | DeLano et al. | 711/206 |
| 6,067,608 | A * | 5/2000 | Perry | 711/203 |
| 6,208,543 | B1 * | 3/2001 | Tupuri et al. | 365/49 |
| 6,381,674 | B2 * | 4/2002 | DeKoning et al. | 711/113 |
| 6,421,711 | B1 * | 7/2002 | Blumenau et al. | 709/213 |
| 6,442,666 | B1 * | 8/2002 | Stracovsky | 711/206 |
| 6,453,404 | B1 * | 9/2002 | Bereznyi et al. | 711/171 |
| 6,640,278 | B1 * | 10/2003 | Nolan et al. | 711/6 |
| 6,857,059 | B2 * | 2/2005 | Karpoff et al. | 711/209 |
| 6,876,656 | B2 * | 4/2005 | Brewer et al. | 370/392 |
| 6,898,670 | B2 * | 5/2005 | Nahum | 711/114 |
| 7,203,730 | B1 * | 4/2007 | Meyer et al. | 709/213 |
| 2001/0049773 | A1 * | 12/2001 | Bhavsar | 711/147 |
| 2002/0010790 | A1 * | 1/2002 | Ellis et al. | 709/238 |
| 2002/0026558 | A1 | 2/2002 | Reuter et al. | |
| 2002/0112113 | A1 * | 8/2002 | Karpoff et al. | 711/4 |
| 2002/0156962 | A1 * | 10/2002 | Chopra et al. | 711/3 |
| 2004/0006572 | A1 | 1/2004 | Hoshino et al. | |

FOREIGN PATENT DOCUMENTS

EP 0380854 * 8/1990

OTHER PUBLICATIONS

Montague, Robert M. et al., "Virtualizing the San", Morgan Keegan Equity Research, Jul. 5, 2000, pp. 1-20.
IBM, "IBM Network Processor (IBM32NPR161EPXCAC133) Product Overview", Nov. 4, 1999, pp. 1-18.

* cited by examiner

*Primary Examiner*—Gary J Portka
*Assistant Examiner*—Kaushikkumar Patel
(74) *Attorney, Agent, or Firm*—Leland Wiesner; Wiesner & Associates

(57) ABSTRACT

A cache connected to the virtualization engine in the center of a storage area network. The invention caches data in a virtual cache, without requiring translation to the physical location. The cache is done as the data crosses the network through the virtualization engine, eliminating the need to do the further translation and forwarding over the network to the actual storage controller in the event the data is in the cache. In addition, the invention eliminates the need for multiple caches at each physical storage controller.

13 Claims, 16 Drawing Sheets

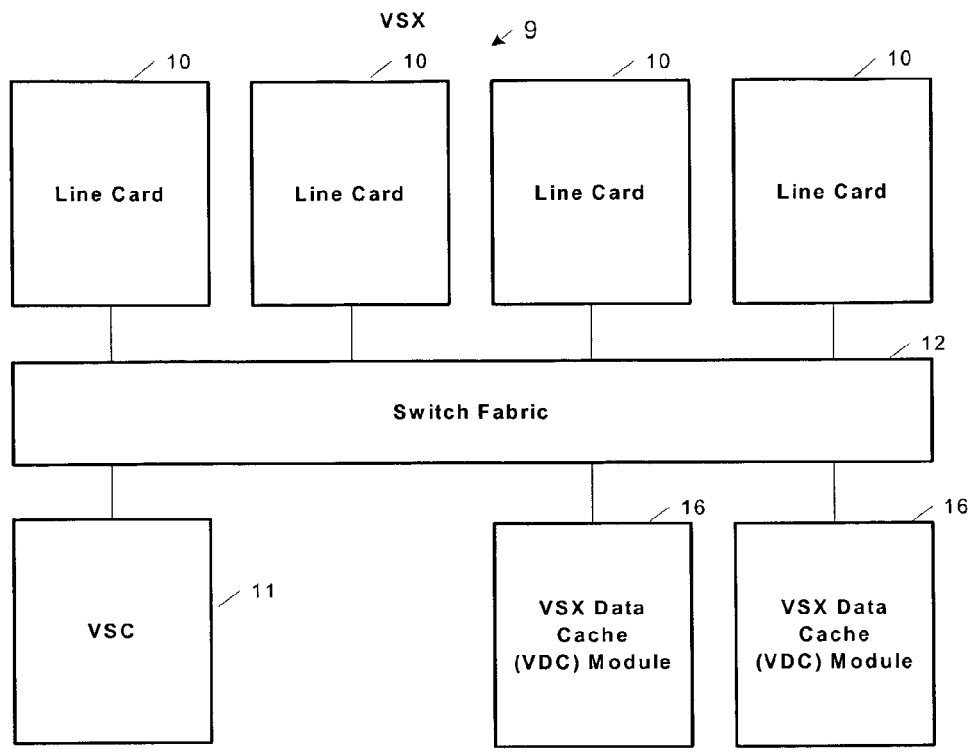
Fig. 1 Basic VSX with VDC System Block Diagram
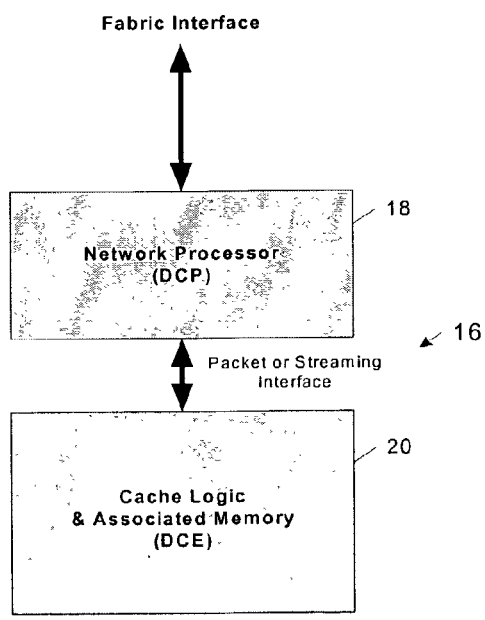
Fig. 2 VSX Data Cache (VDC) Module

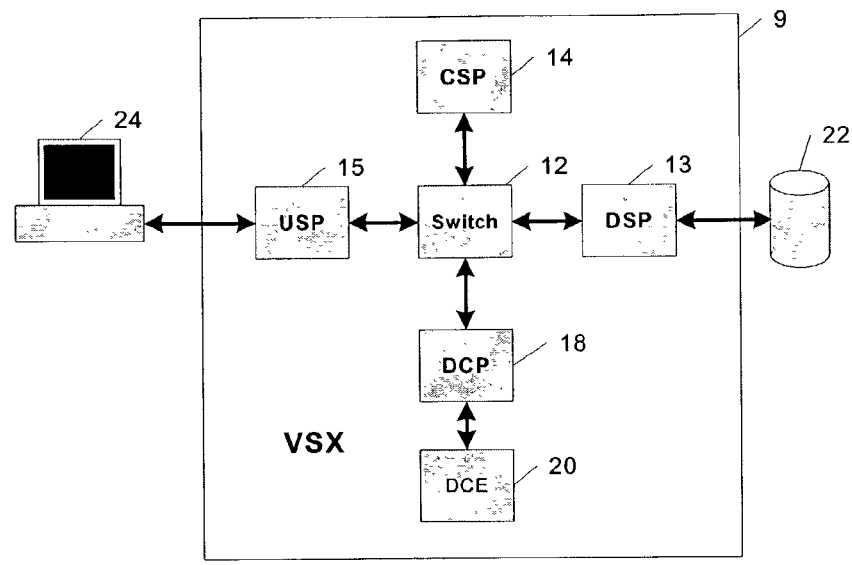
Fig. 3 Logical VSX with VDC In A Simple Storage Area Network
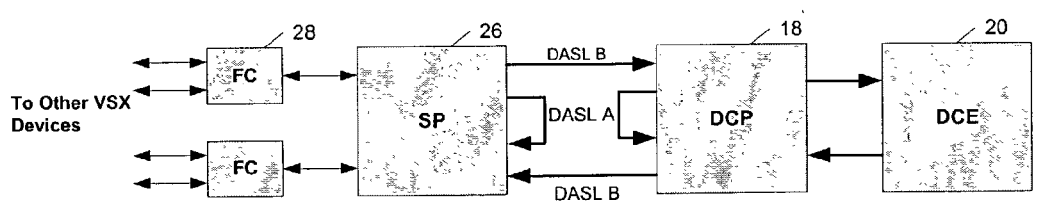
Fig. 4 Single box VSX with Cache (VSX/C)

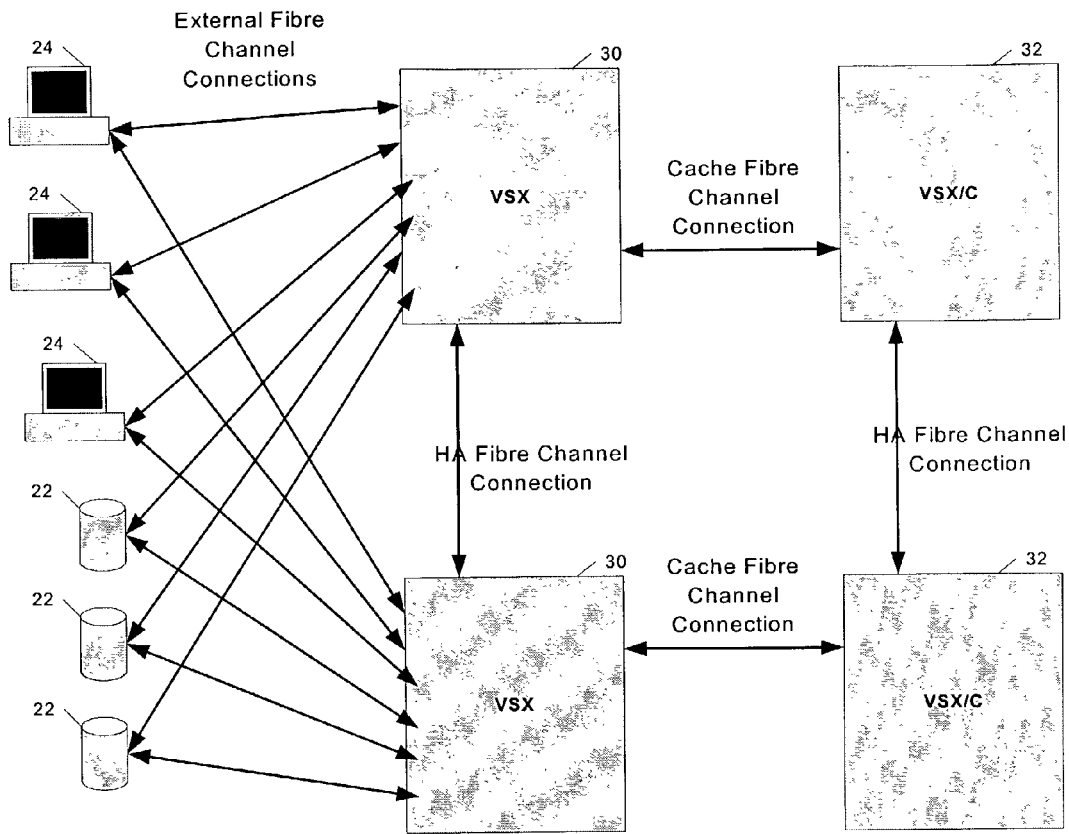
Fig. 5 VSX with VSX/C In Fibre Channel & High Available Configuration
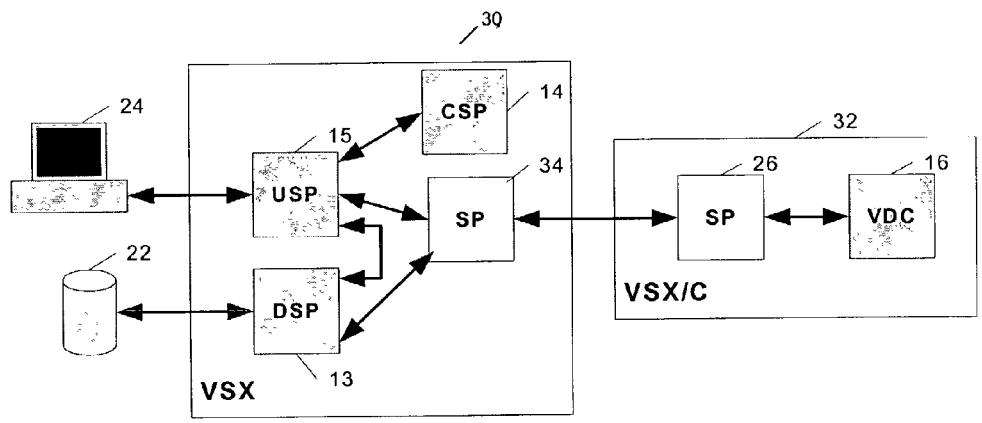
Fig. 6 Logical Interconnect of VSX and VSX/C

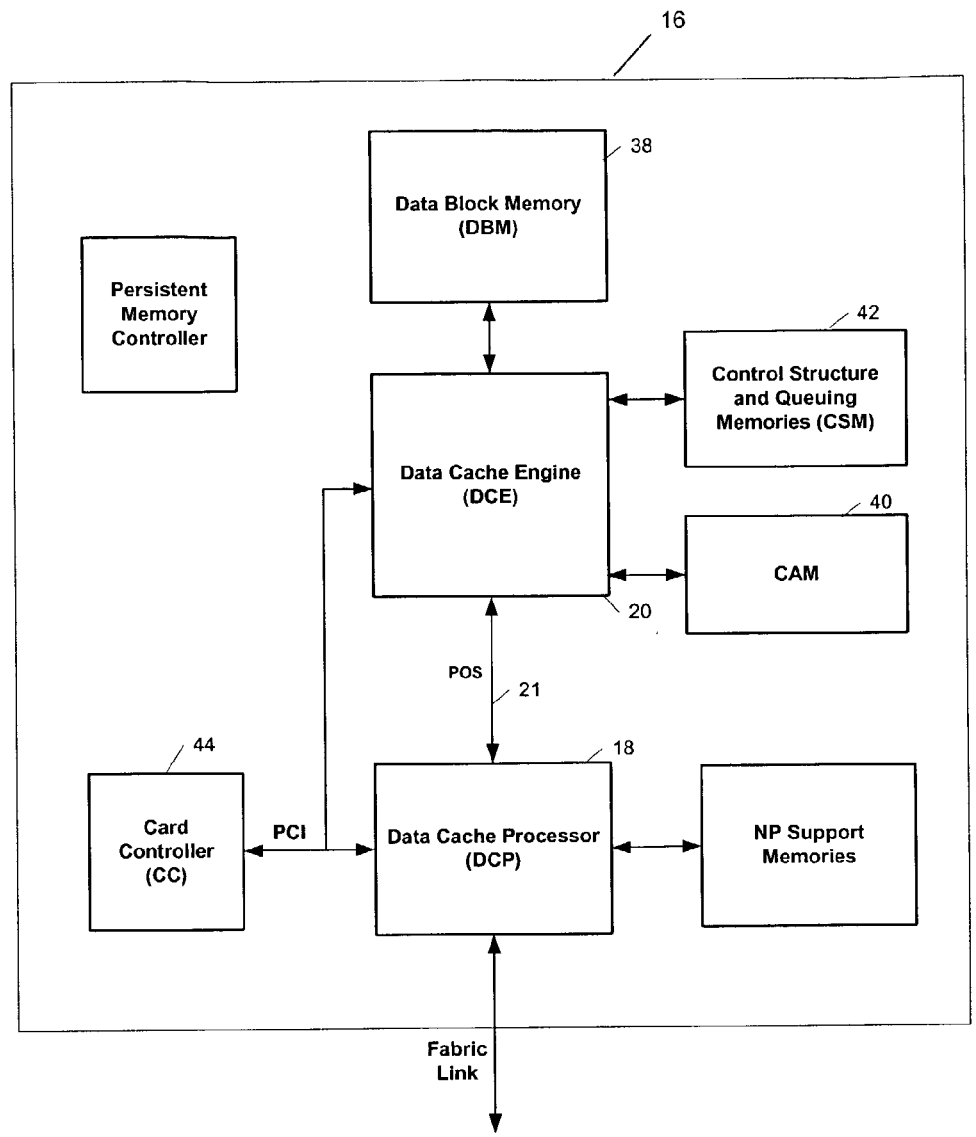
Fig. 7 Detailed VDC Module Block Diagram

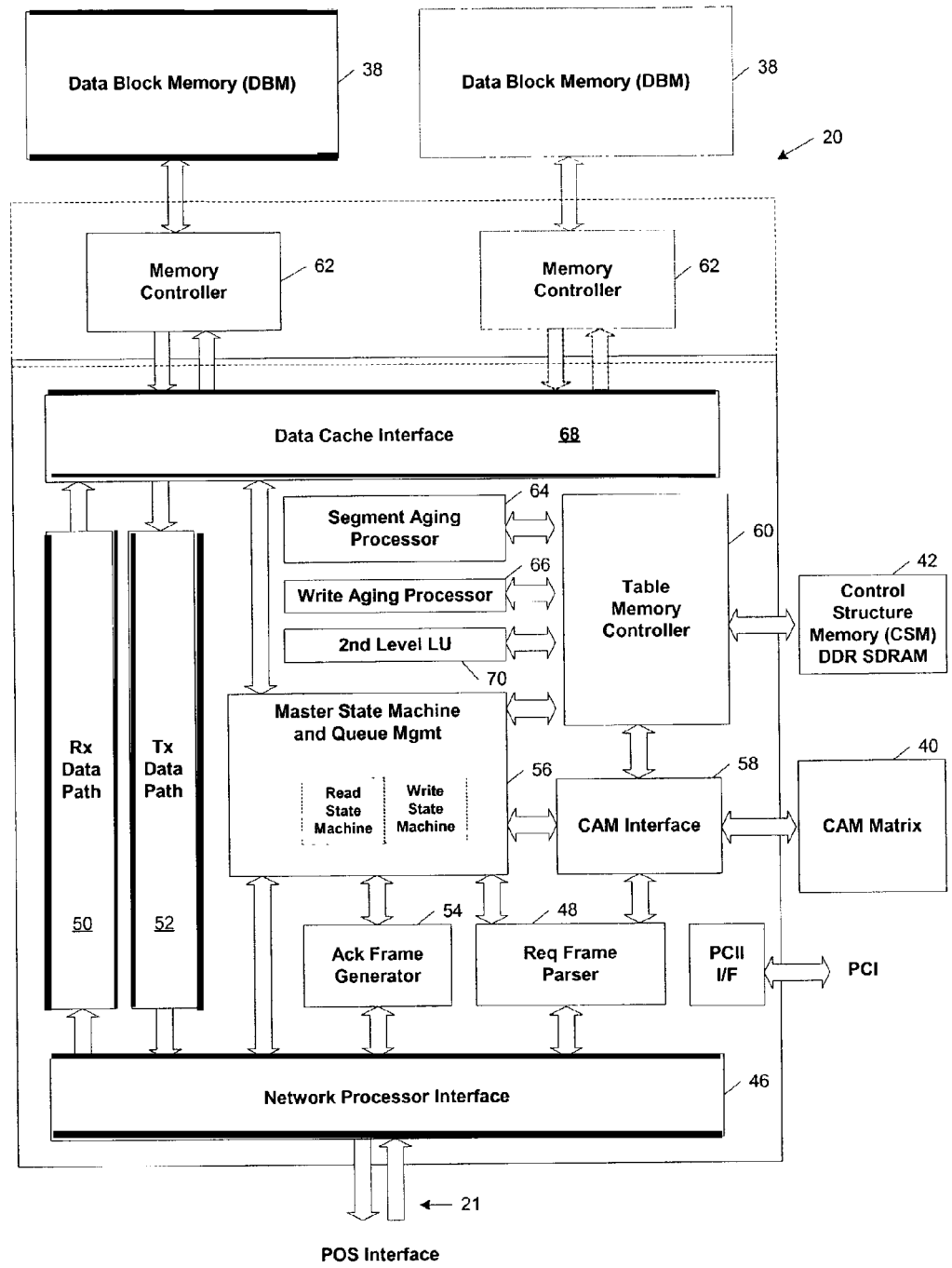
Fig. 8 Data Cache Engine (DCE) Block Diagram

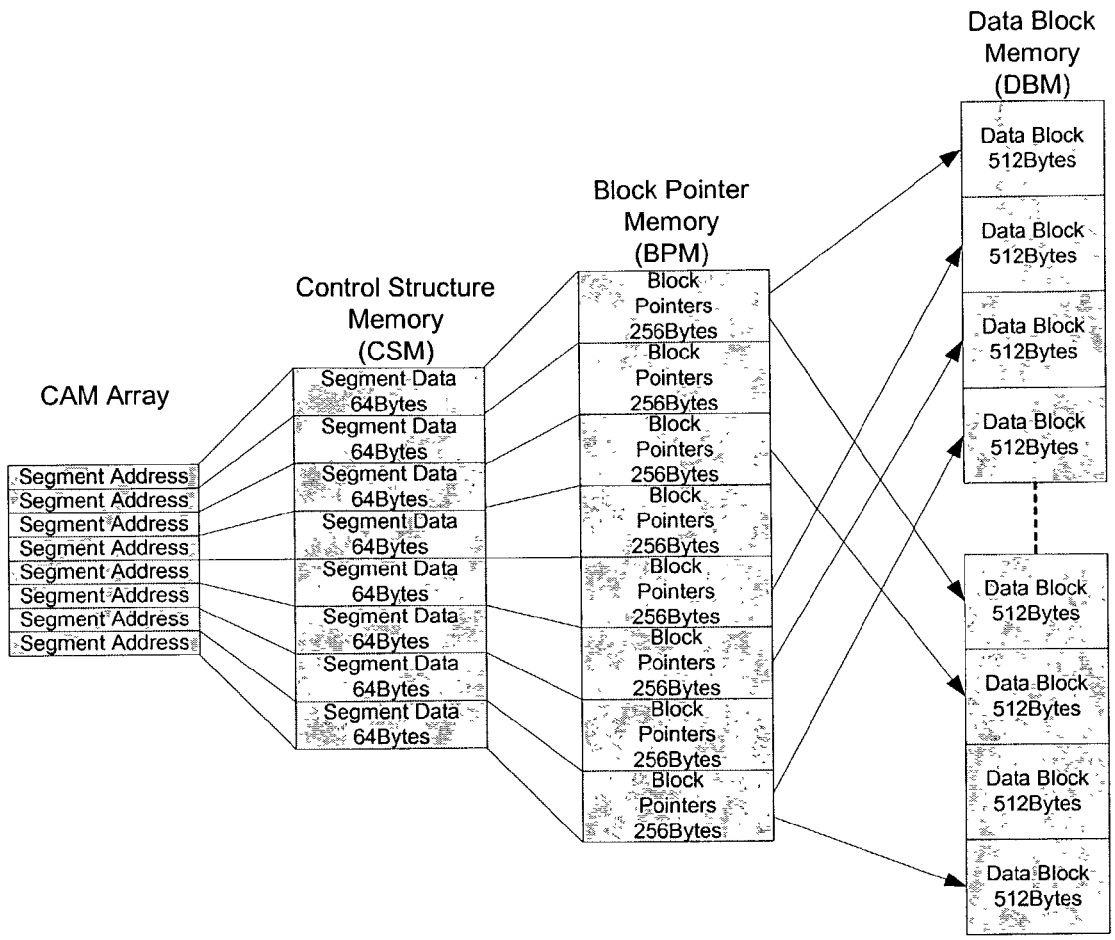
Fig. 9  Example Of Segment Mapping To Data Blocks
Fig. 10  CAM Data Entries

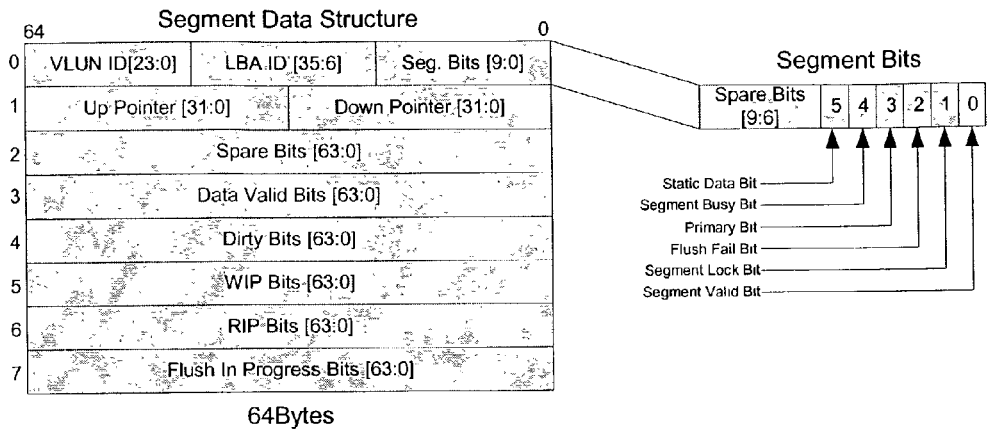
Fig. 11 Segment Data Structure
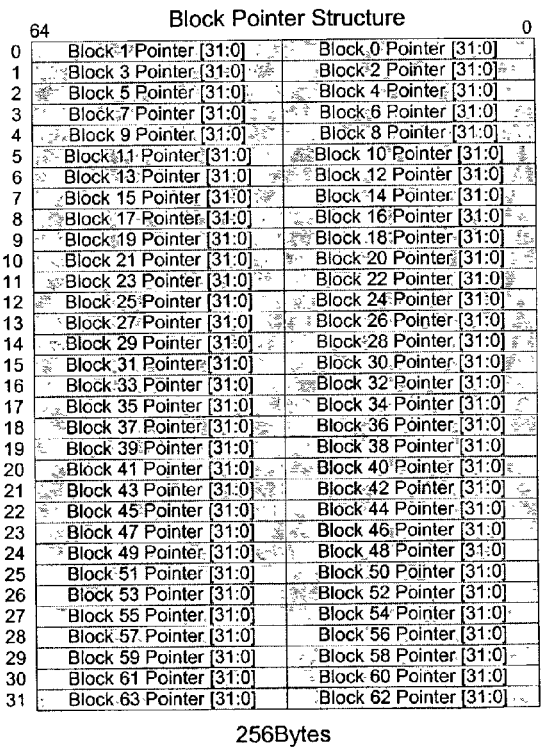
Fig. 12 Block Pointer Structure

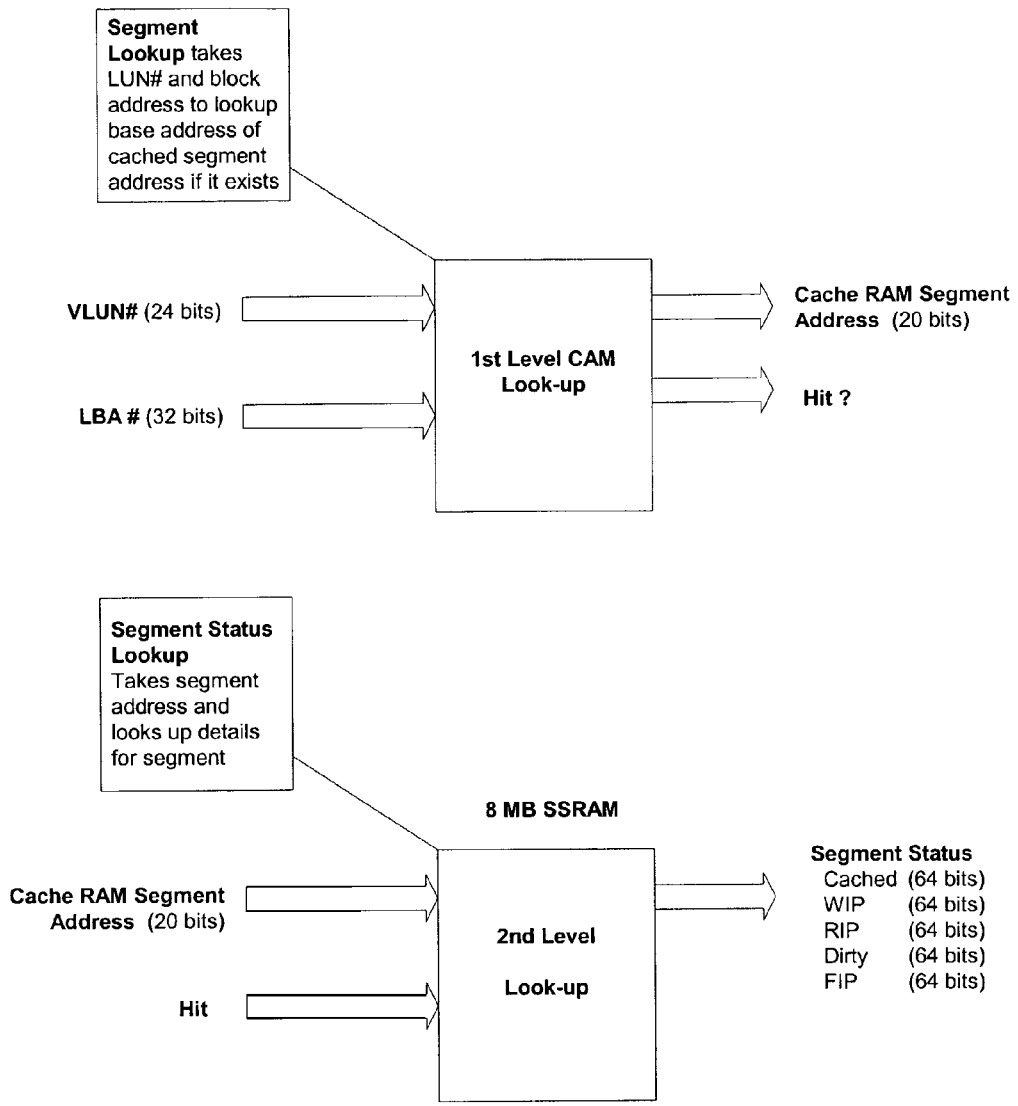
Fig. 13 Look-up Operation

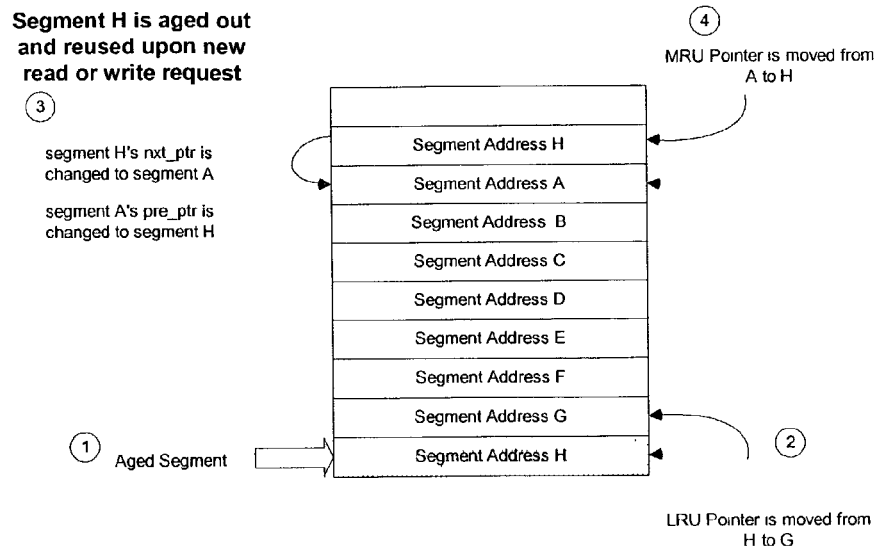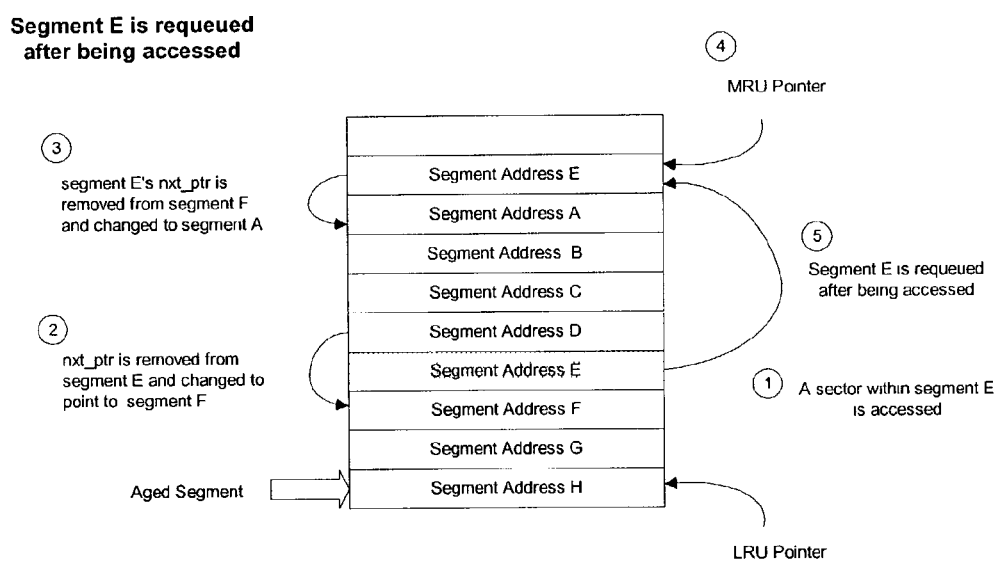
Fig. 14 Segment Aging Operation

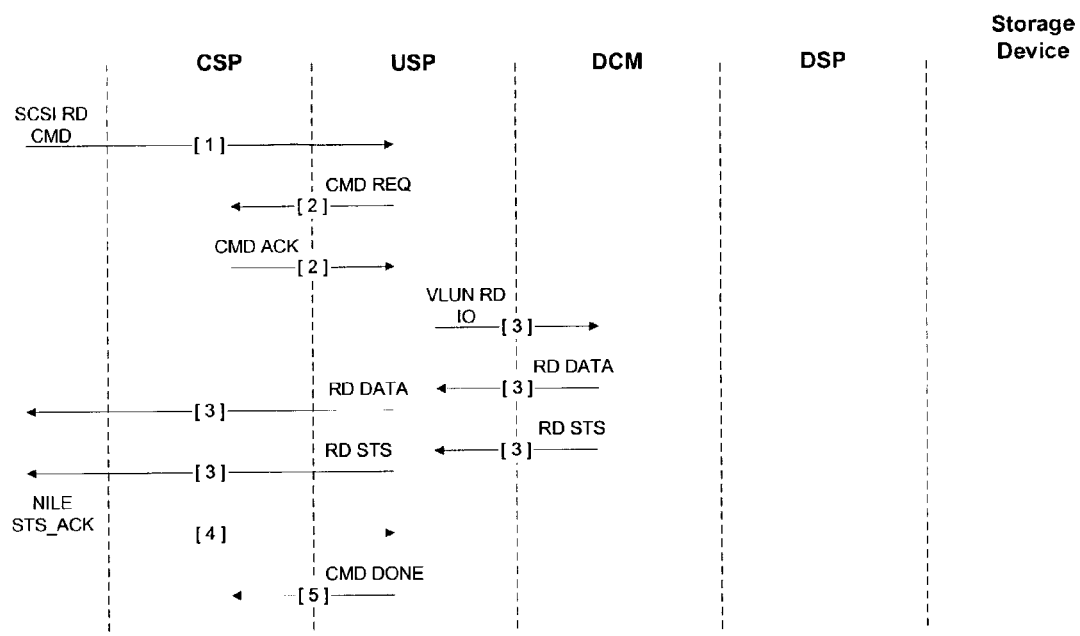
Fig. 15 Cache Read

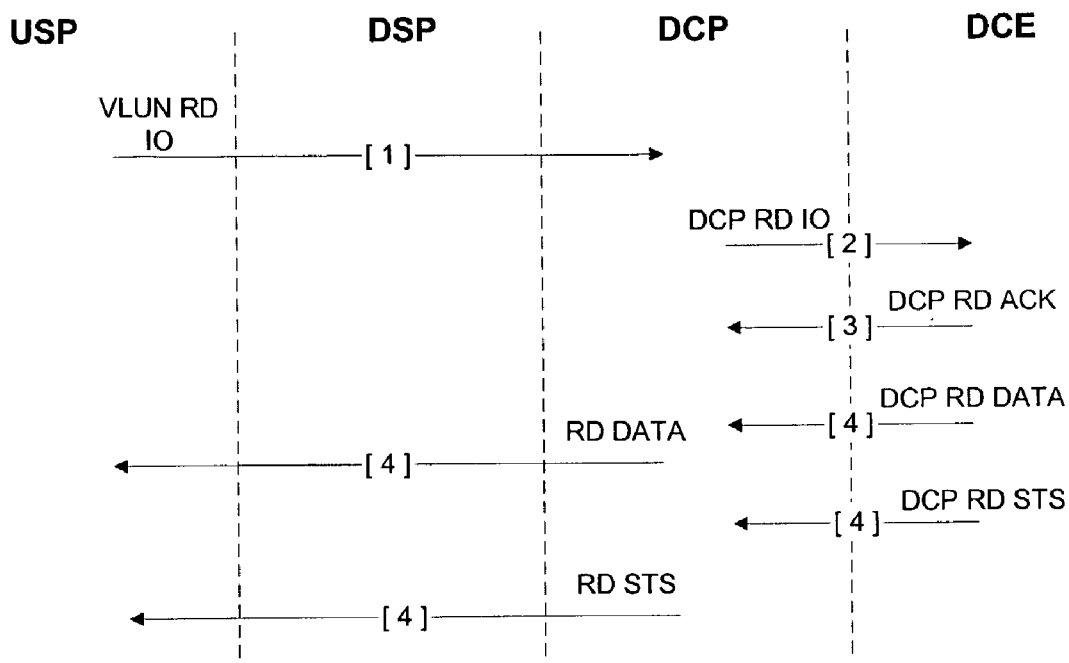
Fig. 16 Internal Cache Read
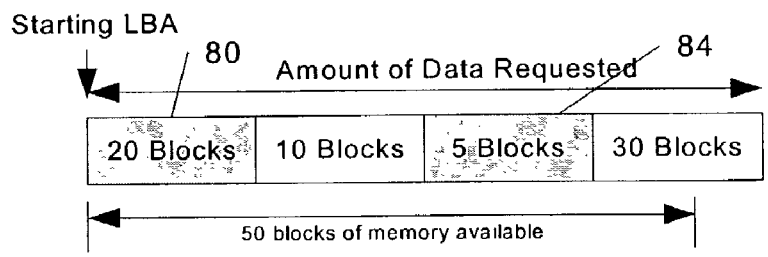
Fig. 17 Cache Memory with Partial Data

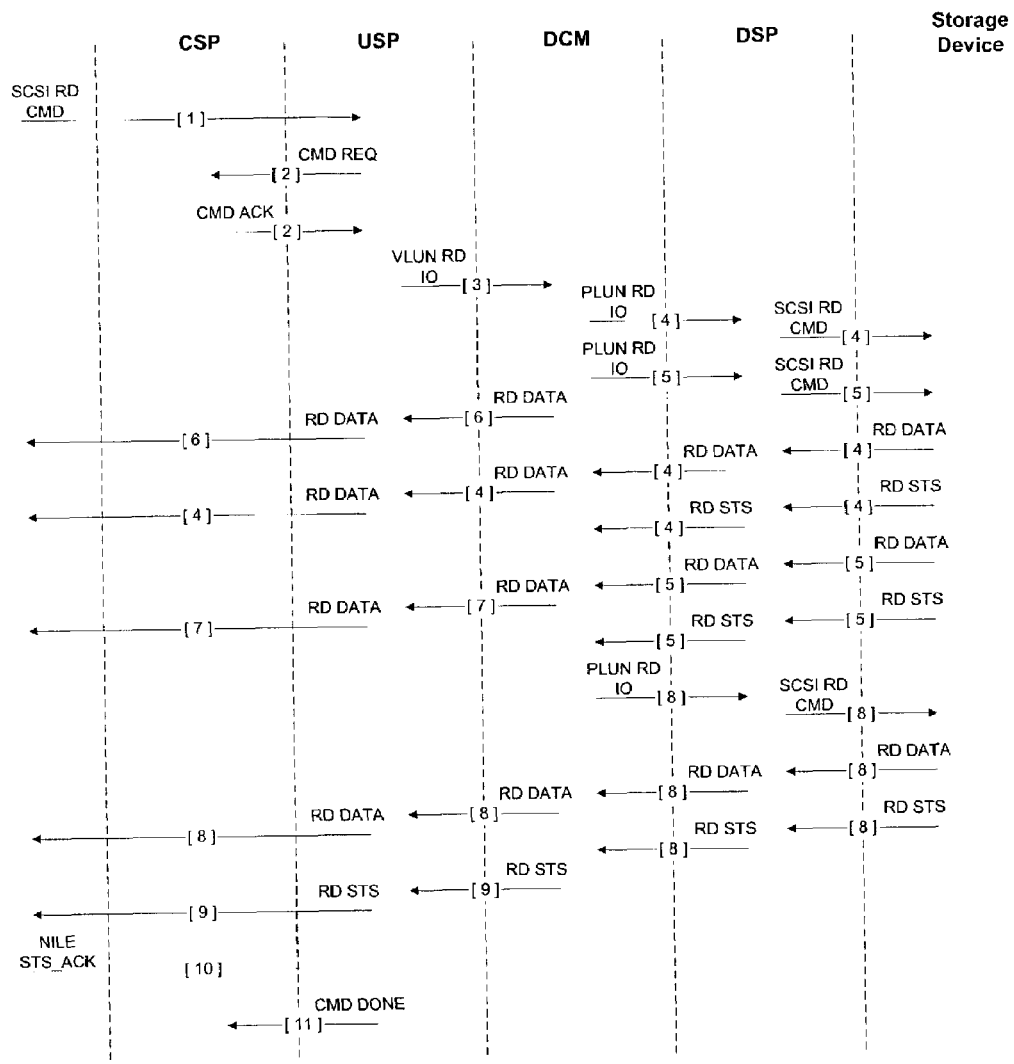
Fig. 18 Cache Read with Partial Miss

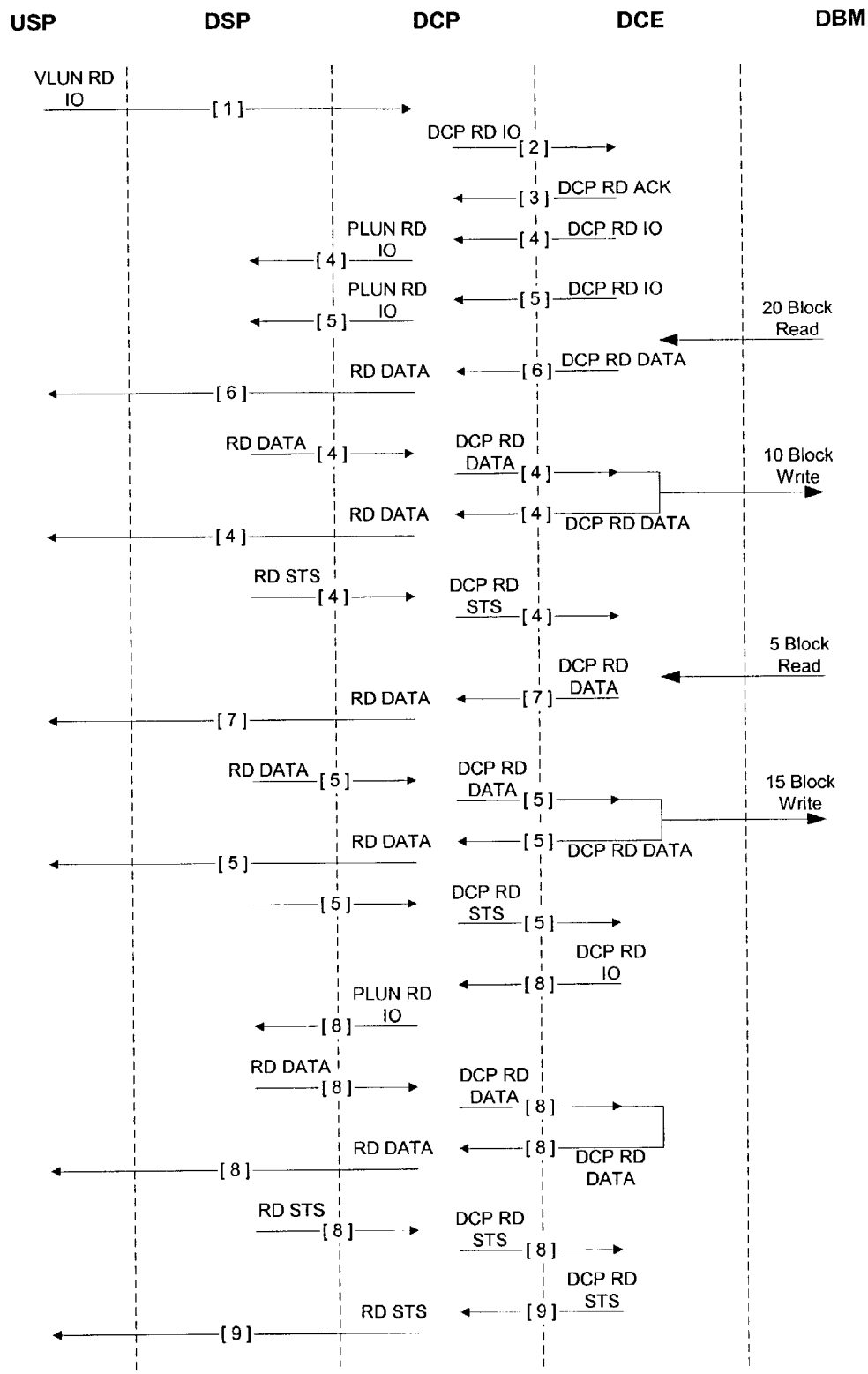
Fig. 19 Internal Cache Read with Partial Miss

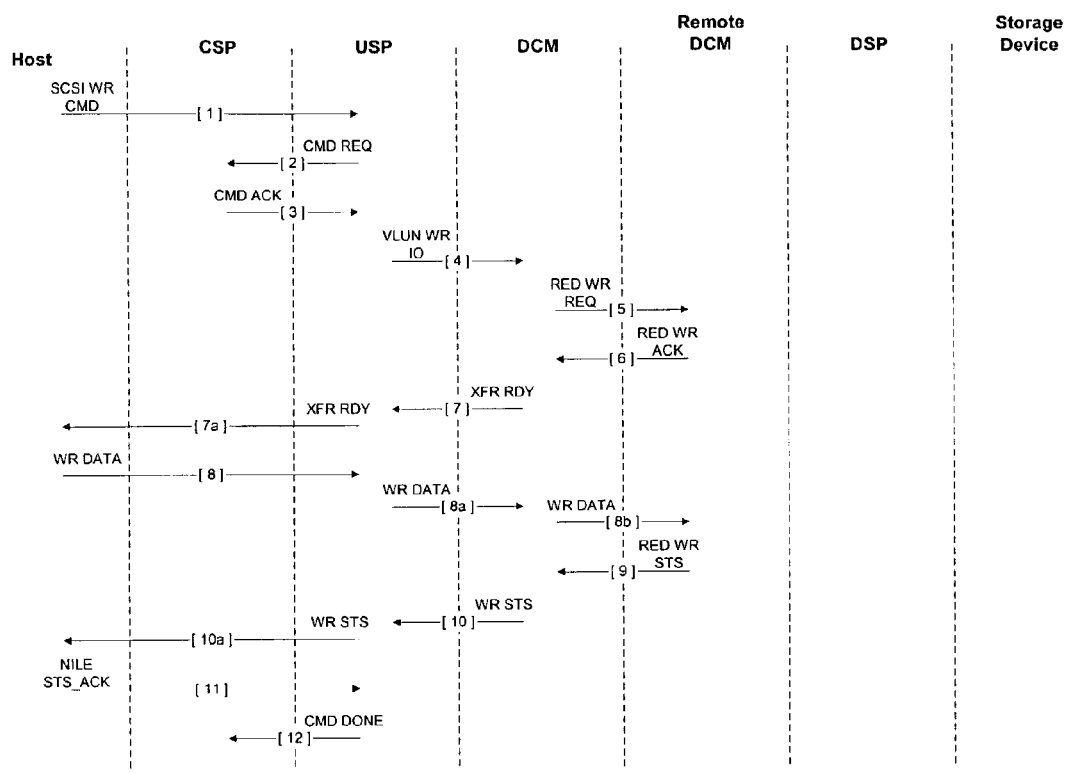
Fig. 20 Successful Cache Write

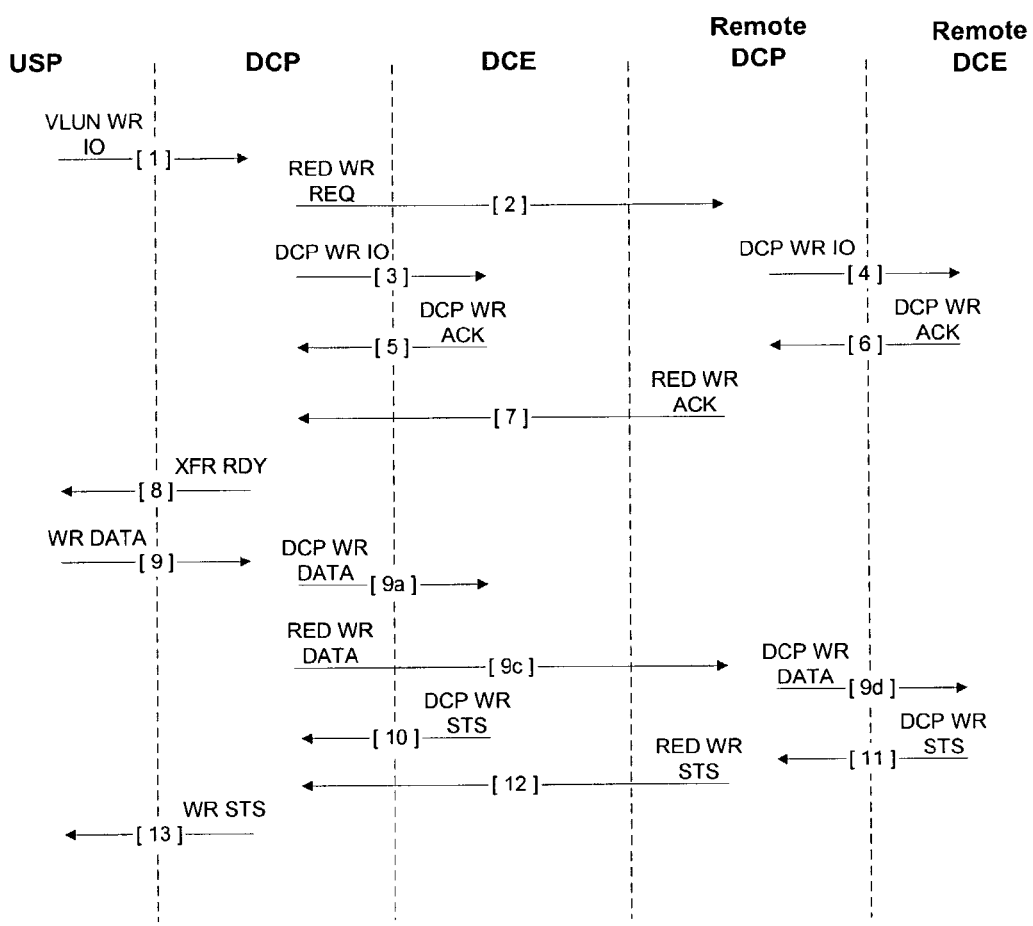
Fig. 21 Internal Successful Cache Write

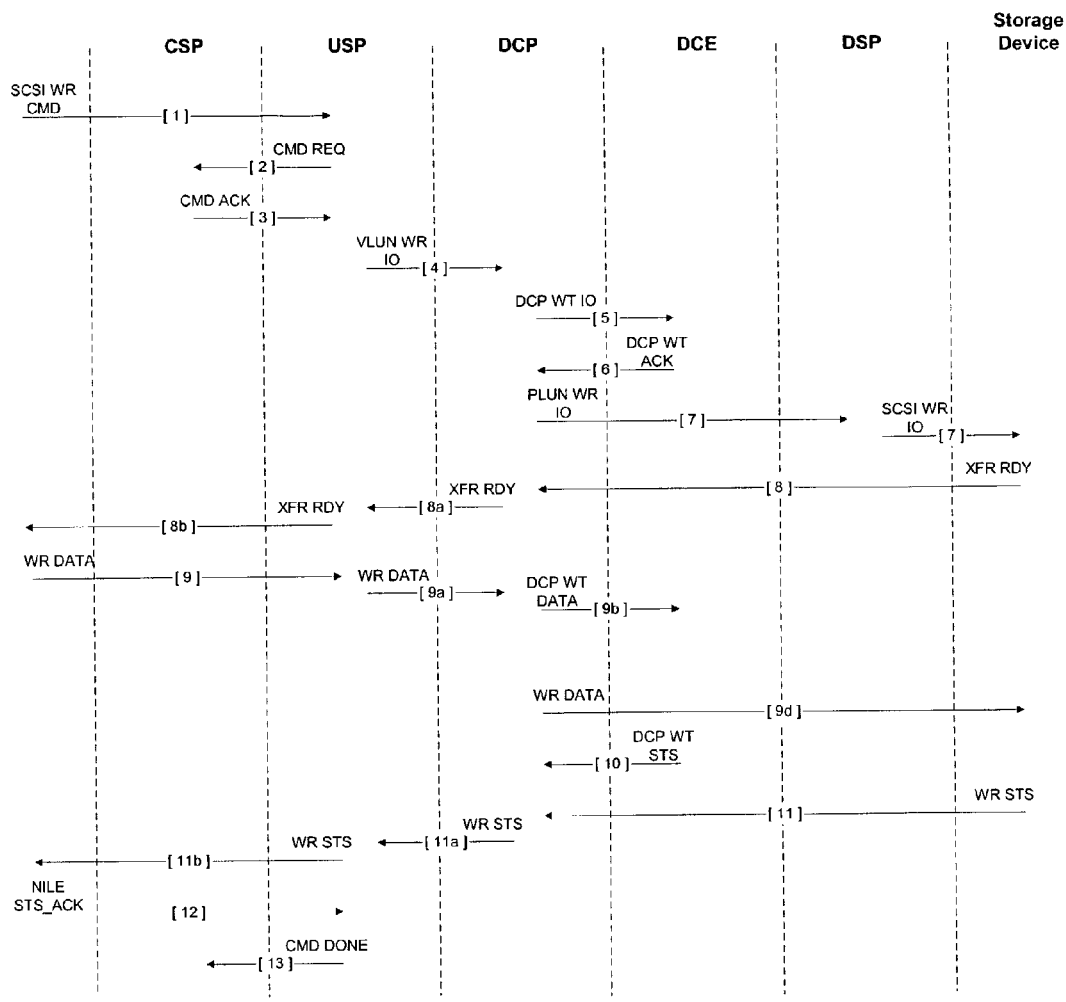
Fig. 22 Cache Write Through

STORAGE AREA NETWORK DATA CACHE

CROSS-REFERENCES TO RELATED APPLICATIONS

This application claims priority to provisional application Ser. No. 60/317,817 filed Sep. 7, 2001, entitled "Method and Apparatus for Processing Fiber Channel Frames at Wire Speed."

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to data caches for storage area networks (SAN).

Caches are well known in many applications. A microprocessor typically will have at least a first level cache on the microprocessor chip itself, and may be connected to a separate SDRAM cache which is a second-level cache. In storage arrays, such as redundant arrays of independent disks (RAID), a storage controller typically will have a cache. In a storage area network, the same cache structure typically is used, with the cache being attached to the storage controller which is then connected to the network. Thus, caching is done at the endpoint of the data transmission over the network.

In a virtual storage area network, a virtualization engine is interposed between the host and multiple physical storage controllers. The host can send data requests to the virtualization engine, which then determines which storage controller to send it to, and forwards the data over the network to the storage controller. The storage controller then uses its own associated cache in connection with data accesses.

BRIEF SUMMARY OF THE INVENTION

The present invention provides a cache connected to the virtualization engine in the center of a storage area network. The invention caches data in a virtual cache, without requiring translation to the physical location. The caching is done as the data crosses the network through the virtualization engine, eliminating the need to do the further translation and forwarding over the network to the actual storage controller in the event the data is in the cache. In addition, the invention eliminates the need for multiple caches at each physical storage controller.

In one embodiment, in order to handle the large amounts of data in a SAN, the cache of the present invention is segmented. A first look-up table, preferably a content addressable memory (CAM), compares a virtual logic unit number (VLUN) assigned to the host and a logical block address of the data being sought to determine if the segment is in the cache. If there is a hit, a second look-up table (e.g., a SDRAM) is used to determine if the logical block is stored in the data cache.

In one embodiment, the virtualization engine examines a tag in the frame to determine if the data is cacheable, with only cacheable data being sent to the data cache, further improving the speed. VLUNs are marked as cacheable or non-cacheable by the operator as they are configured in the system. When accessing data in a cacheable VLUN the host may mark the transaction as non-cacheable.

In a preferred embodiment, the data cache uses a network processor, since the cache is located in the middle of the network, and thus network processing capabilities are required, unlike typical storage controller caches.

For a further understanding of the nature and advantages of the invention, reference should be made to the following description taken in conjunction with the accompanying drawings.

BRIEF DESCRIPTION OF THE DRAWINGS

FIG. 1 is a block diagram of a SAN system incorporating a data cache according to an embodiment of the present invention.

FIG. 2 is a block diagram of the VSX Data Cache Module of FIG. 1.

FIG. 3 is a block diagram of a Logical VSX with VDC In A Simple Storage Area Network according to an embodiment of the invention.

FIG. 4 is a block diagram of a Single Box VSX with Cache (VSX/C) according to an embodiment of the invention.

FIG. 5 is a block diagram of a VSX with VSX/C In Fibre Channel & High Available Configuration, illustrating fibre channel connections, according to an embodiment of the invention.

FIG. 6 is a block diagram illustrating a logical interconnect of VSX and VSX/C according to an embodiment of the invention.

FIG. 7 is a block diagram of a Detailed VSX Data Cache (VDC) Module according to an embodiment of the invention.

FIG. 8 is a block diagram of a Data Cache Engine (DCE) according to an embodiment of the invention.

FIG. 9 is a diagram illustrating the segment mapping to data blocks according to an embodiment of the invention.

FIG. 10 is a diagram of an embodiment of CAM data entries.

FIG. 11 is a diagram of an embodiment of the segment data structure.

FIG. 12 is a diagram of an embodiment of a block pointer structure.

FIG. 13 is a diagram illustrating a look-up operation according to an embodiment of the invention.

FIG. 14 is a diagram illustrating a segment aging operation according to an embodiment of the invention.

FIG. 15 is a diagram illustrating a cache read according to an embodiment of the invention.

FIG. 16 is a diagram of an internal cache read according to an embodiment of the invention.

FIG. 17 is a diagram of a cache memory with partial data according to an embodiment of the invention.

FIG. 18 is a diagram illustrating a cache read with a partial miss according to an embodiment of the invention.

FIG. 19 is a diagram of an internal cache read with a partial miss according to an embodiment of the invention.

FIG. 20 is a diagram of a successful cache write according to an embodiment of the invention.

FIG. 21 is a diagram of an internal successful cache write according to an embodiment of the invention.

FIG. 22 is a diagram of a cache write through according to an embodiment of the invention.

DETAILED DESCRIPTION OF THE INVENTION

The SAN Data Cache of the present invention addresses problems that are created in large SAN installations by providing a SAN-centric resource that increases overall SAN performance and facilitates data and storage resource management. The SAN Data Cache solves and/or provides for the following:

1) Decreases the average write response times from server to SAN.

2) Decreases the average read response times from SAN to server.

3) Facilitates efficient data replication and mirroring through SAN-centric data block caching.

4) Facilitates server-less backup through SAN-centric data block caching and re-segmentation or concatenation.

5) Increases overall SAN performance and efficiency by minimizing physical device reads and writes.

6) Decreases the overall cost of the SAN by minimizing the need for expensive Solid-State Storage Devices (SSD) and high-end storage arrays with large amounts of array-centric cache in performance critical applications 7) Additionally increases the performance of SANs that include remotely mapped devices by caching the associated data closer to the servers and other devices requiring access to it.

The SAN Data Cache will be described in the context as it relates to the Confluence Networks Virtual Storage Exchange (VSX) platform and be called the VSX Data Cache.

The VSX Data Cache (VDC) is the system function that caches data blocks for the VSX platform as they are accessed from external devices. The architecture as presented here details the hardware (and some software) mechanisms required to satisfy the overall system-level requirements of the cache subsystem. In general, the basic functionality of this architecture is independent of the details of other system level building blocks (i.e. switch fabric, network processor, etc.), but may make assumptions for the sake of this description. In addition, the VDC could physically exist within the VSX platform or external to it.

The VDC is designed to serve multiple purposes. One purpose is to keep a local copy of frequently used disk blocks in order to accelerate read and write accesses to the physical disks. Another function of the VDC is to serve as a temporary data store when replicating write data across an array of mirrored disks. The VDC can also serve as a data buffer when transferring data between disk and tape during backup and restore procedures. The real value of the VDC is that it facilitates the above functions and benefits due to the VDC being a fast solid-state entity in the middle of the SAN along with the control and virtualization functionality as opposed to a device at the edge of the SAN disassociated from a centralized control and virtualization function.

Internal Switch Based Data Cache

One embodiment of a VSX system 9 incorporating the present invention is shown in FIG. 1. There are one or more line cards 10, a Virtual Storage Controller (VSC) 11, a switch fabric 12 and one or more VDC cards 16. Each line card 10 may contain one or more instantiations of a Central Storage Processor (CSP), Downstream Processor (DSP) or Upstream Processor (USP).

The data cache hardware is processing transactions at the VLUN (Virtual Logic Unit Number) level and knows nothing about the physical mapping of LUNs. Each VLUN represents a virtual address space (e.g., gigabytes of storage) with defined attributes (e.g., performance parameters, reliability level, etc.). As such, each host computer exchanges data and commands with the VSX system with reference to a particular VLUN. The VLUNs are translated into PLUNs (Physical Logic Unit Numbers).

As the size of the system grows the effective size of data under management will tend to increase. For both of these reasons it will be important to support incremental cache growth. This will allow the system to distribute data bandwidth across the cache interconnect(s) and increase overall cache size to maintain the proper cache-to-disk ratio. It will be a system requirement to map VLUNs to an appropriate cache. This may be based on hot VLUNs, VLUNs per cache, aggregate bandwidth per cache, etc. Scalability and flexibility here will allow performance bottlenecks to be massaged out of the system as access patterns emerge and VLUNs are created.

The basic building block of a cache capable VSX system is the VDC Module 16. A VDC Module 16 is shown in FIG. 2 and is comprised of a Data Cache Processor 18 and a Data Cache Engine 20. In one embodiment the Data Cache Processor (DCP) is a network processor. The DCP is connected to the Data Cache Engine (DCE) via a packet or streaming interface. In one embodiment, the DCE consists of an FPGA (or ASIC) and its support logic.

Internal Switch Based Data Cache System View

The internal switch allows multiple Storage Processors (SPs) to pass data between each other with out relying on the external data path. With a switched architecture the addition of the Data Cache Module is much cleaner in design and easier to scale. FIG. 3 is a diagram of a VSX 9 with internal cache support. It includes DCP 18 and DCE 20 as described above, as well as switch fabric 12. The Down Stream Processor (DSP) 13 connects to an array of disks 22, while the Up Stream Processor (USP) 15 connects to a host 24 over a network. A Central Storage Processor (CSP), 14, also connects to the switch fabric.

External Data Cache

In an alternate embodiment, a VDC unit is external to the VSX platform, and the cache logic is implemented using the current VSX as a building block. A block diagram of such an external cache is shown in FIG. 4. Here there is a caching function (DCP 18+DCE 20) that is connected to an SP 26 and FC (Fiber Channel) Interface chip 28 that facilitates connectivity to an external VSX or FC switch fabric. So the virtualization platform is called the VSX and that same platform modified to become a cache function is called a VSX/C.

System Level View of External Data Cache

A system view of the combination of the VSX and the VSX/C in a high-availability configuration is shown in FIG. 5. FIG. 5 shows a redundant pair of VSX 30 each with a VSX/C 32 for cache support. Each VSX connects to a redundant VSX and VSX/C leaving at least one Fibre channel port for connectivity to hosts 24 and disks 22. The two VSX/Cs also have a redundancy connection between them to accelerate the synchronization of the two cache memories.

In one embodiment, a Fibre channel switch is included on the links between the VSXs and the VSX/Cs to support the expansion of the available cache storage by adding VSX/Cs to the private Fibre Channel network. Of course, Fibre Channel is shown in this example, but this could be any interconnect.

The resulting logical interconnect of the VSX building blocks is shown in FIG. 6. The system consists of the Upstream SP (USP) 13, the Downstream SP (DSP) 15 and the Central SP (CSP) 14, with the new addition of the VDC 16. Due to the Fibre channel interface between the VSX 30 and the VSX/C 32 additional SPs 26, 34 will exist in the data path. These SPs will simply forward the packets to the appropriate hosts and will not perform processing on the packets as they are passed through them. These SPs may serve additional purposes, such as a CSP, DSP or USP, but appear as simple forwarders when dealing with cache data and commands.

Data Cache Module Architecture

One embodiment of the basic data cache module (VDC) 16 hardware block diagram is shown in FIG. 7. The architecture is based around a custom cache controller design and the Network Processor that performs the function of the DCP 18. In one embodiment, the Network Processor is the NP4GS3 available from IBM. Caching functionality is implemented across these two building blocks such that the Data Cache Engine (DCE) 20 is responsible for speedy block lookups and data block management and the DCP is responsible for maintaining the higher-level functionality of error handling as well as providing the interconnect into the switch fabric. The VDC 16 also consists of a large array of SDRAM memory, a Content Addressable Memory (CAM) array and various pieces of support logic. For some applications the SDRAM memory array may include a backup battery and its control/charge logic. The basics of each block is detailed as follows:

Data Cache Engine (DCE)

This function will be detailed later, but a brief overview is provided here.

The Data Cache Engine (DCE) 20 is responsible for parsing requests from the DCP 18 and performing operations with the Data Block Memory (DBM) 38 to satisfy these read and write requests. In one embodiment the DCE 20 uses the POS interface 21 for data and control to the NP 18. The DCE also manages a CAM 40, the Data Block Memory (DBM) 38, a Control Structure Memory (CSM) 42, the request queuing, segment aging, write aging and cleansing dirty blocks stored in the DBM 38.

Content Addressable Memory (CAM)

The CAM 40 provides the lookup as requested by the DCE 20. This CAM contains the presence of segments that may have data blocks mapped into cache. The actual size of this CAM depends upon the number of segments that are actively mapped to cache blocks. This depends upon the Data Cache size, segment size, and any segment over-allocation factor.

Control Structure Memories (CSM)

These memories 42 provide fast access to control structures used to manage and flag the state of all data blocks and segments that are mapped into cache. This memory also contains the pointer to the specific block locations in the DBM. The memory also provides for queues used to manage free blocks, outstanding requests and other management functions. In one embodiment this memory is ECC or parity protected and optimized to multiplex a number of smaller control structure requests.

Data Block Memory (DBM)

The DBM is where the actual data blocks are cached. This memory is ECC protected SDRAM and optimized to run large block level reads and writes.

Data Cache Processor (DCP)

The DCP 18 is an off-the-shelf network processor used in this context provides the higher-level virtualization and cache synchronization functions that the lower level hardware will not be cognizant of. In addition it is tailored to handshake with the DCE and provide the connection into the system switching fabric.

Card Controller (CC)

A CC 44 provides for the card-level control capability. It is responsible for boot-up code, diagnostics, Ethernet and console support, etc.

Data Cache Engine (DCE) Architecture

The DCE 20 is the heart of the Data Cache architecture. It provides many of the essential hardware mechanisms required to implement the Data Cache. The block diagram in FIG. 8 shows a more detailed view of the DCE.

The DCE performs the following functions:

Interface to the DCP
DCP request frame parsing and processing
DCP acknowledgement frame creation
DCE request frame creation and acknowledgement (write flush)
Request queuing
CAM interface and management
Read Request State Machine
Write Request State Machine
Cache control structure maintenance
Data block memory interface
Segment aging processor
Write aging and queue maintenance
Free buffer queue (non-direct mapped blocks)
Block-level CRC generation and checking that can be turned on and off by software
PCI interface for side-band control
Embedded Processor for list and memory management (optional)

Network Processor Interface (NPI)

NPI 46 is a packet interface module that is responsible for ingress and egress to/from the DCE. The ingress path on receiving a frame (w.r.t. DCE) splits the header from the data and sends the header to a Request Frame Parser (RFP) 48 and the full frame to an Rx Data Path buffer 50. The POS CRC will also be calculated on the full frame during ingress.

The egress path will transmit (w.r.t. DCE) a POS frame over the interface 21 to the DCP. The complete frame is read from a TX Data Path 52 or an Ack Frame Generator (AFG) 54. The POS CRC is calculated prior to writing the frame into this buffer so protection is maintained within the data path buffer and AFG as well.

Request Frame Parser (RFP)

The RFP 48 is responsible for parsing the header of the incoming POS frame. The header information will be neatly written into a fixed data structure that is allocated in a Master State Machine (MSM) 56 and queued in the Work Queue for processing by the other functional blocks. The RFP also parses, generates and sends the appropriate key information to the CAM Interface.

Acknowledge Frame Generator (AFG)

The AFG 54 generates frames to acknowledge requests made by the DCP.

CAM Interface

A CAM Interface 58 is responsible for controlling accesses to a CAM matrix 40 made from the various requesters. It will issue the commands and pass segment addresses and status to/from the RFP 48, MSM 56 and Table Memory Controller (TMC) 60 blocks.

CAM Matrix

This may be one or more CAMs organized in a manner to satisfy the VLUN and block address mapping within the cache itself. The CAM will map the VLUN/block address to a segment address that it provides upon a hit. The segment address will provide access to a data structure within the TMC used to identify the status of individual blocks within the segment.

Table Memory Controller (TMC)

The TMC 60 is responsible for controlling the access to the Control Structure Memory (CSM) 42. The TMC takes access requests from SAP, WAP and $2^{nd}$ level lookup and processes them accordingly.

Block Memory Controller (BMC)

The BMC 62 is responsible for controlling the read and write access to the Data Block Memory (DBM) 38. The BMC takes requests from the DCI, performs memory accesses and returns status to the DCI.

Segment Aging Processor (SAP)

The SAP 64 is a linked list manager used to implement the LRU aging function for the segments. As segments are accessed the SAP places them on top of the aging queue. The LRU segments will fall to the bottom of the queue and they will be the ones that are aged out of the cache. See FIG. 14 for more details.

Write Aging Processor (WAP)

The WAP 66 is used to age dirty cache blocks for writing out to storage. The WAP will age dirty cache blocks in much the same way as with the SAP except the WAP must flush the blocks in a more controlled and time critical manner. There are thresholds that will determine when a write is aged out to the storage device.

nd Level LU

A 2nd level LU 70 processes the segment information retrieved from the CAM interface and determines which blocks in the segment are currently stored in the Data Block Memory 38. The $2^{nd}$ level LU 70 also determined the status of the blocks stored in the DBM.

Master State Machine (MSM)

The MSM 56 is the master controlling function within the chip. It is responsible for the coordination of the entire basis functional blocks as well as queuing functions, movement of data via DMA, scheduling and context management.

Data Cache Interface (DCI)

The DCI 68 is the interface to the Block Memory Controllers. The DCI performs the mapping and muxing function of the BMCs to the other internal data path modules within the DCE. The DCI will perform DMAs under control of the MSM.

Write Data Path (WDP)

The WDP (Rx Data Path 50) is used to write data into the data cache. It is a speed-matching FIFO between the NPI and the DCI.

Read Data Path (RDP)

The RDP (Tx Data Path 52) is used to read data from the data cache. It is a speed-matching FIFO between the DCI and the NPI. During reads the cache supplies data from the DCI.

Cache Data Storage

The cache data storage is used to store data that is cached during normal read and write commands as well as the static read and write commands. The standard data stored in the DBM is organized in blocks and segments as illustrated in FIG. 9. In one embodiment each block contains 512 bytes of data and is the smallest unit that can be written to the cache memory.

In order to ensure a greater flexibility the DCE may be configured to support larger blocks of data in its block memory. A fixed space is allocated for each block stored in the DBM. The amount of space allocated for each block is slightly larger than the largest block supported by the VSX Data Cache. As the blocks are stored in the allocated space, flags will be updated to indicate the size of the block actually stored in the memory. This will allow each cache module to support a variety of block sizes in the same physical cache. Each of the blocks stored in the DBM includes a CRC to protect the integrity of the data blocks stored in memory.

In order to minimize the amount of search entries in the CAM, the data stored in the cache memory is organized into segments. In one embodiment each is used to track 64 blocks of data and has an associated data structure as well as a pointer array. The segment data structures contain information about the status of the stored blocks while the block pointer array contains the address at which the data blocks can be found. FIG. 9 shows the relationship between the CAM array, the segment data structures, the pointer array and the individual blocks stored in the memory.

The addressing for the segment data structures and the pointer array is generated from the address of the segment entry in the CAM. Each entry in the CAM (FIG. 10) contains a vector that contains the 24-bit VLUN ID for the segment and the upper 30 bits of its starting Logical Block Address (LBA).

Each access to and from the cache memory may span multiple segments depending on the starting address and the size of the data access. The cache logic will generate one or more segment addresses using the starting LBA and size of the data access. These segment addresses are combined with the VLUN ID of the command and are passed to the CAM as a search key. The CAM searches its internal array and returns the address of the matching entry. In some cases new entries will have to be created and the CAM will return the address of the newly created entry. The address returned by the CAM is shifted 6 bits and added to the segment data base address to find the location of the data structure for the segment.

The segment data structure, shown in FIG. 11, contains all of the information necessary to mange the blocks of data in the cache memory. The data structure contains the VLUN ID and starting LBA of the segment. This value can be compared with the search key to verify the of the CAM lookup operation.

The data structure has 10 bit locations for segment specific information. The segment valid indicator, bit 0, bit is used to determine if this is an active segment or part of the free segment pool. The lock indicator, bit 1, is used to lock the segment data into the cache. Writes to the segment data will still be allowed, dirty data will still be written to the disk and missing blocks will still be added to the cache memory when needed. The data will not be removed from cache regardless of its age until the lock bit has been cleared. The Flush Fail bit is used to indicate that a flush was attempted for the data in this segment that has its Flush In Progress bits set. This flag is used to block access to the data until the problem can be resolved by the DCP. The Primary bit indicates that any dirty data in this segment is owed by this cache engine and must be flushed when possible. The segment busy bit may be used as a lock when processing commands or when performing aging functions. Operations on the segment are not allowed when the busy bit is set. The static data bit indicates that this data is being accessed as static data and should never be automatically flushed. The remaining 4 bits in the vector are reserved for future use.

Two 32-bit pointers in the data structure are used to hold its place in an aging chain. The aging mechanism of the VSX cache logic and the use of these pointers will be discussed later in this document.

The remaining bits in the data structure are used to indicate block specific values. Each of the 64 blocks of the segment has a bit to define each of the following:

The block is valid and currently stored in cache memory
The block is dirty and needs to be written to the disk
A read command is currently active for the block
A write command is currently active for the block
The cache data is currently being written to the disk.

In addition to the above bits each block has a spare bit that is reserved for future use. Each data structure uses 64 bytes of memory.

The amount of segment entries allowed is dependent on the size of the CAM used in the design. Every time a segment is created to store one or more blocks the number of available segments is decreased. One design approach to the cache logic is to make the number of segments equal to the total blocks the memory can support divided by the number of blocks in each segment. This gives a 1 to 1 mapping between the segments and the block memory. The design is simplified because the block address can be generated directly from the base address of the segment data structure. Indirect pointers to the individual block locations are not needed.

This design approach results in the automatic allocation of 64 block memory locations each time a segment is created. It is possible that only a few blocks in each segment will contain valid data. The remaining blocks will be unused and are unavailable for blocks outside of the segment. Another embodiment is to increase the number of segments supported in the design while maintaining the size of the block memory. The change necessitates the usage of indirect pointers to the actual data stored in the block memory as shown in FIG. 9. Each segment has an associated pointer array that contains a pointer for each of the 64 blocks in the segment. The address of the pointer array for a segment is generated directly from the segment data structure address. Each pointer array contains a 32-bit pointer for each of the 64 blocks supported by the segment.

As FIG. 12 illustrates, the pointer array for each segment consumes 256 bytes of memory. Each pointer location contains a value that is used to generate the address for the associated block. Values in this array are only valid if the data valid bit is set in the segment data structure. When a new segment is created it initially contains no valid data blocks. As each block of data is added to the cache the segment is allocated a pointer to a location in block memory. The pointer to this allocated block location is written to the pointer array and the proper data valid bit in the segment is set. As a block of data is flushed from the cache the data valid bit for the block will be cleared and the pointer will be added to list of available locations.

The VSX cache design can support both the direct and indirect method of block address lookup and any ratio between segments and block memory locations. It is preferred that the indirect method be used to be more efficient with DBM resources.

Segment/Block Look-Up Operation

As shown in FIG. 13, segment look-up operations are performed by passing the VLUN number and LBA to the CAM function. If the segment that the block falls within is in the cache, then a segment hit occurs. This segment address is then used to look-up the data structure containing the status information about the segment itself. In this data structure the individual block status resides. If the status shows that a block is present in the cache, then a read hit occurs for a read or a write hit for a write. There are other status bits that indicated whether it is safe to read or write (i.e. Read-In-Progress or Write-In-Progress). The segment address will also be used to create the base address into the data cache memory for actual access of the data.

In the case of the indirect method of addressing the data blocks, the segment address is used to generate an address to a data structure that contains the pointers to the cached data blocks.

LRU Segment Aging Mechanism

The cache segments must be aged to determine which will be replaced when new segments are required for allocation. Segments are aged in hardware using a basic LRU algorithm implemented using linked lists and head and tail pointers. Since the segments are always kept in LRU order and the segment that has data being accessed is linked into the aging data structure there are no searches required to age the segments. An example of how this is done is shown in FIG. 14.

The aging mechanism will track how much data is currently being stored as static data. The amount of free storage plus the amount of static data must be above the static data threshold. If the total amount is below the threshold the aging engine will begin to allocate more space. Once static data has been unlocked it will be treated as normal cached data when checking the static data threshold.

Caching Command Processing

The VDC can serve as a cache for read and write accesses to disk as well as serving as a temporary data store for mirroring operations.

The following sections are a high level overview of the data and command flow to and from the VDC starting with the basic read and write operations to a cacheable VLUN.

Read Command

A read command (FIG. 15) is a host to disk read that is routed through the VDC. This read will result in data being pulled from internal cache memory or read from the disk. A copy of the data read from disk will be stored in the cache memory.

Read commands for a cacheable VLUN are routed to the VDC for processing. The VDC will determine which data is stored locally and how much data needs to be read from the physical device. If data is missing from the cache memory the VDC will attempt to read it from the disk and store it in cache memory. Read commands are not synchronized between redundant cache modules.

Read Hit

Read commands to the VDC may result in either a miss or a hit on data stored in the cache memory. The first command example demonstrates the command and data flow for a cache read hit.

FIG. 16 shows the data flow within the VDC for the read command shown in FIG. 15.

Read With Partial Miss

It is possible that some of the data needed to complete the read command will be missing from the data cache memory. FIG. 17 shows an example case where 65 blocks are requested with the data cache memory containing some of the data requested by the host. The areas 80, 84 represent data currently contained in the cache memory. In this example the DCE can only allocate space to store an additional 25 blocks of data on top of the 25 blocks already stored in the data cache.

The DCE will first determine which data is stored locally in the cache and which data needs to be retrieved from the disk. As the DCE determines that data needs to be retrieved from the disk it will attempt to allocate cache space to store the retrieved data. When the DCE runs out of space to store the data locally it will mark the last block it was able to allocate storage for. The DCE will then generate read requests to the disk for the missing blocks of data up to the point that it was able to allocate space.

In this example the DCE will find that it can allocate space for 25 blocks of data. It will mark the 50th block as the last block that it was able to allocate space for. The DCE will then generate two read requests to the storage device. The first read request is for 10 blocks of data with the second read request being for the 15 blocks of data it was able to allocate space for. When the DCE sends the read requests out it will set a flag it indicate to the DCP that the data being read from the disk can be received out of order.

While the DCE is waiting for the missing data to be retrieved from the disk it will send any data up to the first missing block to the host. In this example the first 20 blocks of data can be sent to the host while the DCE is waiting for the data read from the disk.

As the data read from the disk arrives at the DCE the state of the command will determine what is done with the read data. If local storage space has been allocated for the data the DCE will store the data in the allocated space. If the data being received is the next block of data needed by the host the data will also be forwarded to the host. In this example as the first read of 10 blocks is received from the disk it will be forwarded to the host as well as the local cache memory.

Once the missing 10 blocks have been sent to the host the DCE will then send as much data to the host as it has stored locally. If the second read of 15 blocks has completed it will be able to send 20 blocks to the host. If not only the 5 blocks of data stored locally can be sent.

Once the first 50 blocks of the command have been sent to the host the DCE will then complete the command by generating a read to the disk for the last 15 blocks of data. This data cannot be stored locally and will be forwarded directly to the host as it is received. When the DCE sends out this read request it will flag the command to indicate to the DCP that the data must be received in order.

The flow diagram in FIG. 18 shows the command steps as they are executed.

FIG. 19 shows the data flow within the VDC for the command shown in FIG. 18.

As the DCP receives the VLUN RD command from the USP it converts the command into a CACHE RD command and forwards it to the DCE. The DCE then processes the command and determines which data is located in the local memory and which data needs to the retrieved from the disk. The DCE attempts to allocate cache space for the data that is to be fetched from the disk.

The DCE then generates read requests for the missing data that it has allocate memory space to store. The read requests are send to the DCP as DCP_RD_IO packets. The DCP will convert these reads to PLUN addresses and forward to the proper DSP. The read ahead commands will be flagged to indicate to the DCP that the read data can be received out of order.

Once the read ahead commands are sent to the disk the DCE will read the 20 blocks of data it has in the DBM and form this data into DATA packets and forward them to the DCP. The DCP will forward the read data to the proper USP.

As the read ahead data is received from the disk it will be stored at the appropriate locations in the DBM. This data may or may not be received from the disk in order. If the data is in order and the block received matches the next block to send to the host the data will be looped internally and forwarded directly to the host. If the data is coming in out of order it will be written directly to the memory and not forwarded to the host until the data has been reordered. As each frame of data is received that state of the command will be checked to see if any data can be sent to the host.

The DCE will continue this process until all of the data up to the allocation point has been sent to the host. Once this has occurs the DCE will generate a DCP_RD_IO command for the remaining data. This data will not be stored locally when received and will simply be looped back to the DCP. The offsets will be adjusted to match the original command.

When the command has completed the DCE will generate a DCP_RD_STS packet indicating that all data has been transferred and the command is complete.

The initial RD command sent from the DCP to the DCE can be marked as a lock read. As each segment is accessed or allocated in the command processing its lock bit is set. The DCP also has the ability to send an unlock command to unlock a range of data in the cache memory.

Read Ahead

In some cases it is beneficial from a performance standpoint to pre-fetch data from the disk and store it in the data cache. A field in the DCP_RD_IO command will indicate the pre-fetch length for the read command. During the processing of the read command the DCE will attempt to allocate enough space to read in this extra data. If any space can be allocated the data will be read into the data cache memory. This data will not be forwarded to the host. The status of the read ahead will be indicated to the DCP with an extra DCP_RD_STS packet.

Write Command

The write command is a cacheable data transfer from the host to the disk. The processing of the write command will result in the data being stored in the data cache memory if space can be allocated in the local and redundant cache module. If space cannot be allocated in both cache modules the command will be converted to a write through.

In some applications it may be necessary to ensure that any dirty data stored within the data cache is also stored in a redundant module. In the preferred embodiment the local VDC will ensure that the data can be stored both locally and in the remote VDC before the write command is allowed to proceed.

Any data written to a cacheable VLUN is routed to the VDC for processing. The write data can be stored locally if the following conditions are met:

The local DCE can allocate enough space to handle the entire write command

The DCE on the redundant VDC can allocate enough space to handle the entire write command If either of these conditions is not met the DCE will assume the command will be converted to a write through. In either case an ACK will be sent to the DCP to indicate the success/failure of the command processing. The DCP may choose to allow the command to continue as a write through or abort the command and allow the write to proceed directly to the disk. The DCE on the redundant VDC will always be aborted in this case.

The VDC also supports a version of the write command that forces the DCE to allocate space for the write command. This command is used then the DCP wishes to store the write data locally so it can be written to one or more disks at a later time.

Successful Write Command

FIG. 20 shows the data and command flows for a successful write command to the VDC.

The example command shown in FIG. 20 the host attempts to write to a cacheable VLUN. The USP requests permission from the CSP to proceed with the command. If successful the USP forwards the write request to the VDC. The VDC will do an internal check to determine if space for the write can be allocated in its local cache memory. The VDC will also forward a RED_WR_REQ to the remote VDC that will check if it can allocate space for the write command. If so the remote VDC will return a RED_WR_ACK to the local VDC. If the local VDC can allocate space it will allow the transfer to proceed by generating a XFR_RDY packet to the host. The host will then transfer data to the VDC through the USP. As the VDC receives each packet of data it forwards a copy to the remote VDC. Once all of the data has been transferred the remote VDC will send a RED WR STS to the local VDC to indicate that the data has been successfully written. If the local data has also been successfully written the VDC will send a WR STS back to the initiating host. The command is then completed.

FIG. 21 shows the details of the command and data flow within the VDC for the command detailed in FIG. 20.

When the DCP receives the write command from the USP it translates it into a RED WR REQ to the redundant DCP. Both the local and the remote DCP generate DCP WR IO packets to their local DCE. Each DCE then attempts to allocate space for the expected data. As space is allocated in the cache memory the blocks are marked as valid, the dirty bits are set and the write in progress bits are set. Each DCE then responds with a DCP WR ACK packet to alert the local DCP that it is ready to accept the write data. The remote DCP sends a RED WR ACK to the local DCP. If the local DCP receives ACK packets from both the local DCE and the remote DCP the command is allowed to proceed. The DCP generates a XFR RDY packet to the USP.

As the WR DATA is received from the USP the DCP must generate a copy for the local DCE and the remote DCP. As data enters the DCE the proper segment and blocks are located and the data is written into the pre-allocated locations in cache memory. The write in progress bits for the written blocks are then cleared and the dirty data bits for the blocks are set. If the DCE is the primary DCE for the command as indicated in the original write command the Primary bits for the blocks will also be set.

When the DCE detects that it has written all of the data associated with the command it sends a DCP WR STS packet to the DCP. The remote DCP will forward the packet in the form of a RED WR STS packet. The local DCP will wait for the remote response and the local DCE response. When both responses are received the DCP generates a WR STS packet to the USP indicating a successful write.

Write Through Command

In some applications the system may want to perform a write through command to the VDC. In a write through command data will be written directly to the disk with a local copy being written into cache memory. The write though command can be used when a redundant cache module is not available or is currently in a failed state. A write through command also occurs when data cannot be allocated during a write command.

The process begins when the host initiates a write request to a cacheable VLUN. The write request is forwarded to the DCP. The DCP will create a DCP WT IO to the DCE and a PLUN WR IO to the storage device through the DSP. The DCE will attempt to allocate storage locations for the expected data and will acknowledge the write request with a DCP WT ACK. Any storage locations allocated or currently in memory that are affected by the write command have their data valid and write in progress bits set. The DCE will always return a successful even if all of the blocks could not be allocated. The storage device will proceed with the write request and send XFR RDYs through the DSP to the USP. As the data is transferred from the host device to the storage device it is routed through the DCP and DCE. The POS interface on the DCE will create a copy of the write data and route it back to the DCP. The DCP then forwards the write data to the DSP and on to the storage device.

The DCE will attempt to store the write blocks into the cache storage memory. If the blocks exist in memory the data will be written to the block and the write in progress bit will be set. The dirty bit is not set because the data is also being written to the storage device.

The diagram in FIG. 22 details the data and command flows during a write through command.

As will be understood by those of skill in the art, the present invention may be embodied in other specific forms without departing from the essential characteristics thereof. For example, the data cache could use DRAM instead of SDRAM, and an addressing structure other than CAM could be used. Instead of Fiber Channel, SCSI or any other interconnect could be used. Instead of POS or other bus could be used. Accordingly, the foregoing description is intended to be illustrative, but not limiting, of the scope of the invention, which is set forth in the following claims.

What is claimed is:

1. A storage area network comprising:
   a virtualization engine;
   a first network port connected to said virtualization engine to receive data access requests from one or more hosts, said data access requests identifying data with virtual addresses;
   a second network port connected to said virtualization engine to connect to a plurality of storage controllers, said virtualization engine to translate the virtual addresses into physical addresses and to forward the data access requests to one or more storage controllers of the plurality of storage controllers according to the physical addresses;
   a data cache connected to and directly accessible by said virtualization engine with the virtual addresses using a segment identifier for identifying at least one segment combined with a block identifier for identifying at least one block of the identified segment to be accessed, said data cache further including:
   a first level look-up table providing a first hit signal and a segment structure address if the segment identifier corresponds to a segment in said data cache; and
   a second level look-up table having a control structure memory providing a final hit signal and a storage address if a block being accessed corresponds to a block in said data cache wherein the control structure further includes status information bits: write in progress, read in process, data valid, dirty and flush in progress bits.

2. The storage area network of claim 1 wherein:
   said first level look-up table is a content addressable memory; and
   said second level look-up table is at least one static memory chip.

3. The storage area network of claim 1 wherein said data cache further comprises:
   a data block memory for storage of said data;
   a data cache engine to manage the storage of said data stored in the data block memory; and
   a network processor configured to route data accesses to and from the data cache engine, and interface to the virtualization engine.

4. The storage area network of claim 1 wherein said virtualization engine further comprises:
a module for examining a cacheable tag in frames received, and forwarding only cacheable frames to said data cache.

5. The storage area network of claim 1 wherein said second level lookup table comprises:
a control structure memory containing status information for a data cache segment; and a block pointer structure containing pointers to data blocks in said data cache segment.

6. The storage area network of claim 1 wherein said status information further includes:
a status data bit;
a segment busy bit;
a primary bit;
a flush fail bit;
a segment lock bit; and
a segment valid bit.

7. The storage area network of claim 1 wherein said data cache further comprises:
a segment aging processor; and
a write aging processor.

8. The storage area network of claim 7 wherein said segment aging processor further comprises:
a doubly linked list, with an up pointer pointing to a top of an aging queue and a bottom pointer pointing to a bottom of said aging queue.

9. The storage area network of claim 1 wherein said data cache is configured to pre-fetch data from said plurality of storage controllers into said cache, in addition to data requested by and returned to said one or more hosts.

10. A storage area network comprising:
a virtualization engine;
a first network port connected to said engine to connect to at least one host;
a second network port connected to said engine to connect to a plurality of storage controllers;
a data cache connected to and directly accessible by said virtualization engine with a virtual address using a segment identifier for identifying at least one segment combined with a block identifier for identifying at least one block of the identified segment to be accessed; said data cache being a virtual cache accessed directly with one or more virtual addresses and configured to cache data communicated between said at least one host and the plurality of storage controllers, and comprising:
a first level look-up table providing a first hit signal and a segment structure address if a segment identifier corresponds to a segment in said data cache;
a second level look-up table having a control structure memory providing a final hit signal and storage address if a block being accessed corresponds to a block in said cache wherein the control structure further includes status information bits: write in progress, data valid, dirty and flush in progress bits;
a data block memory for storage of said data communicated between said at least one host and the plurality of storage controllers;
a data cache engine to manage the storage of data stored in the data block memory; and
a network processor configured to route data accesses to and from the data cache engine, and interface to the virtualization engine.

11. A method comprising:
receiving a data access request from a host at a virtualization engine; and
determining whether the data access request can be processed using a virtual cache connected to and directly accessible to the virtualization engine with a virtual address using a segment identifier for identifying at least one segment combined with a block identifier for identifying at least one block of the identified segment to be accessed said virtual cache further providing a first hit signal and a segment structure address if the segment identifier corresponds to a segment in said virtual cache and providing a final hit signal and a storage address if a block being accessed corresponds to a block in said virtual cache and further includes status information bits: write in progress, read in process, data valid, dirty and flush in progress bits, wherein the virtual cache is configured to cache data communicated between the host and a plurality of storage controllers in a storage area network.

12. The method of claim 11, further comprising processing the data access request using the virtual cache if it is determined that data request can be processed using the virtual cache.

13. The method of claim 11, further comprising forwarding the data access request to at least one of the plurality of storage controller controllers if it is determined that data request can not be processed using the virtual cache.

* * * * *